Dec. 6, 1966   H. A. ROSE   3,290,510
ELECTRICAL APPARATUS
Filed June 28, 1963   5 Sheets-Sheet 1
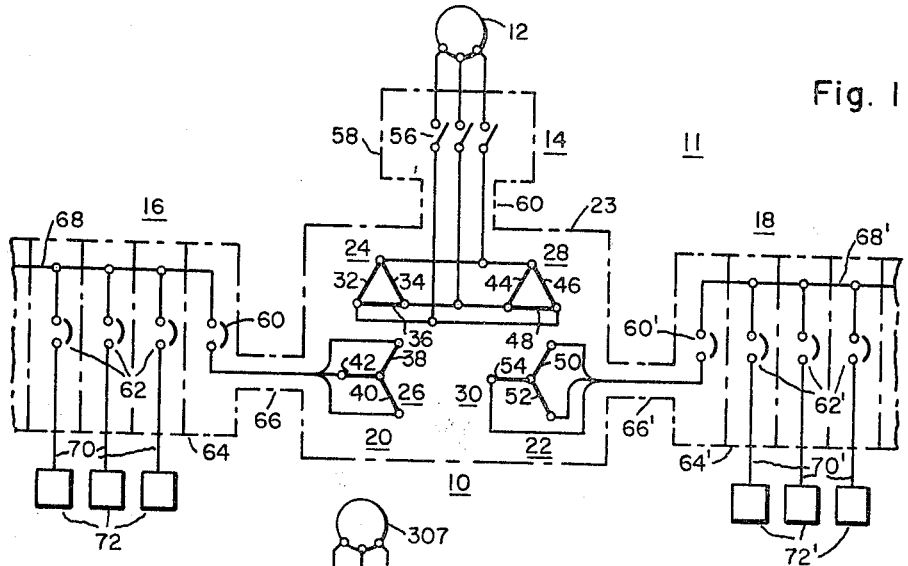
Fig. 1
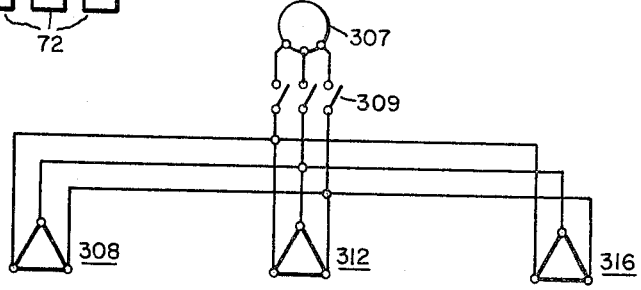
Fig. 8
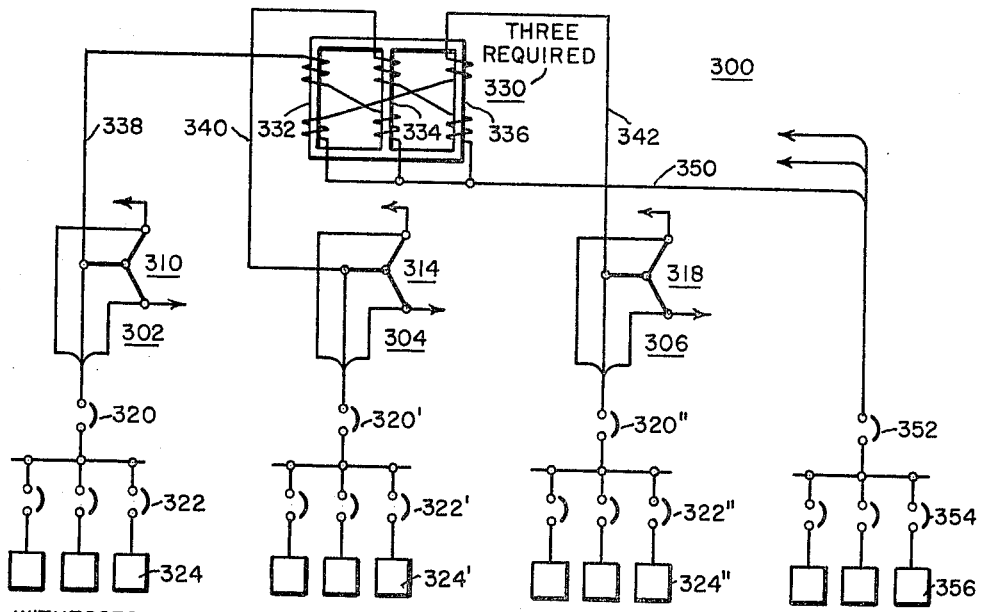
WITNESSES
*Leon J. Laza*
*James T. Young*
INVENTOR
Herbert A. Rose
BY *Donald R. Lockey*
ATTORNEY Dec. 6, 1966   H. A. ROSE   3,290,510
ELECTRICAL APPARATUS
Filed June 28, 1963   5 Sheets-Sheet 3

United States Patent Office 3,290,510
Patented Dec. 6, 1966

1

3,290,510
ELECTRICAL APPARATUS
Herbert A. Rose, Bellevue, Wash., assignor to Westinghouse Electric Corporation, Pittsburgh, Pa., a corporation of Pennsylvania
Filed June 28, 1963, Ser. No. 291,554
7 Claims. (Cl. 307—17)

This invention relates in general to electrical power apparatus and more particularly to industrial power center equipment.

Industrial power center equipment, comprising electrical inductive apparatus and associated switchgear, is presently limited in maximum thermal load ratings or kva. rating because the short circuit current produced by the electrical inductive apparatus increases with the kva. rating. More specifically, the maximum kva. rating of industrial power center transformer equipment is presently limited to ratings which provide a short circuit current that does not exceed the limiting current interrupting capabilities of conventional low voltage control apparatus for small and medium size motor ratings. Conventional low voltage control apparatus usually has maximum current interrupting capacities in the range of 15,000 to 25,000 amperes, which limits the transformer kva. ratings in low voltage power centers to 750 or 1000 kva., with said transformers having impedances of 5.5 and 7.5%, respectively. In power centers having larger ratings, such as 2000 or 2500 kva., it becomes necessary to place current limiting reactors in the power center feeder lines or in the motor control centers, or use special fuses at each motor control center, or resort to more expensive breaker cascade combinations.

With the extremely high reliability and virtual freedom of maintenance of sealed indoor transformer equipment, there is no longer any desire to maintain a large plurality of power center equipments in a plant merely to insure service continuity. Therefore, from a plant design viewpoint it is highly desirable to increase the kva. rating of power center equipment to decrease the valuable plant space presently required for the plurality of power center equipments. Further, when short circuit current capability of a power center is increased to those values associated with 2000 kva. ratings and higher, the secondary switchgear costs on the various feeder buses are substantially increased. It is, therefore, desirable that new and improved low voltage industrial power center equipments be provided that have an increased kva. capacity without increasing the short circuit current capability above the limiting magnitudes of conventional low voltage control apparatus.

In some instances, it is desirable to have high current interrupting capacity busses as well as low current interrupting capacity busses, so as to serve the larger loads in the industrial plants, such as large motors. The high capacity busses may be at the same or higher potential than the lower capacity busses. The present practice is to utilize separate power center equipments for each load bus. It would be desirable to combine the low current interrupting capacity busses and the high current interrupting capacity busses in one power center having an increased kva. rating, thus eliminating the necessity of having a plurality of incoming switching means and also saving valuable floor space. However, this combination would have to be attained without increasing the short circuit current available on the low current interrupting capacity busses.

Accordingly, it is an object of this invention to provide new and improved power center apparatus.

Another object of this invention is to provide new and improved power center apparatus having increased thermal load capacity without substantially increasing the short

2 circuit current producing capability of the power center transformer equipment.

Another object of this invention is to provide power center apparatus having increased thermal load capacity and utilizing a single high voltage disconnecting means, without imposing any higher current interrupting requirements on the loads connected to said power center apparatus.

A further object of this invention is to provide new and improved power center apparatus having transformer equipment with higher kva. ratings without increasing the short circuit current producing capability of certain of the feeder busses of said power center apparatus and increasing the short circuit current producing capability of the remaining feeder busses.

Still another object of this invention is to provide new and improved power center apparatus having transformer equipment with increased kva. ratings supplying electrical power of the same potential to a plurality of feeder busses without increasing the short circuit current capacity of certain of said feeder busses.

Another object of this invention is to provide new and improved power center apparatus having transformer equipment with increased kva. ratings supplying electrical power at different potentials to a plurality of feeder busses, without increasing the short circuit current capacity of the lower potential feeder busses.

Briefly, the present invention accomplishes the above cited objects by providing an industrial power center having an electrical transformer constructed with sectionalized primary and secondary windings. The transformer has a kva. rating equal to the sum of the kva. ratings of the various sections, while maintaining an impedance comparable to a transformer rated at a kva. equal to one of the sections. More specifically, by providing a transformer having a plurality of primary and secondary windings disposed on a common magnetic core, the primary windings may be connected in parallel and utilize one incoming high voltage disconnecting means, and the individual secondary sections may each be connected to a plurality of feeder busses and, therefore, feed independent loads. The kva. rating of the transformer will be equal to the sum of the kva. ratings of the various secondary sections, however, the interaction of the sectionalized windings produces a reactance which limits the short circuit current produced by each secondary winding or section to substantially the same magnitude that would be produced by a transformer having a total kva. rating equal to only one of the secondary winding sections. Therefore, a transformer of increased kva. has been provided that will limit short circuit current to magnitudes heretofore only available in much smaller rated transformer equipments.

The objects cited relative to providing an industrial power center having both low interrupting capacity feeder busses and high interrupting capacity feeder busses are also accomplished by constructing a transformer with sectionalized primary and secondary windings. The primary windings are connected in parallel circuit relation, thus utilizing a single disconnecting means, and the secondary windings are connected together through load current balance coils. Tap connections on the load current balance coils form the high short circuit current capacity bus, which is used to feed large loads, and the conventional connections to the secondary transformer windings form the low short circuit current capacity busses for supplying smaller loads. The interaction of the sectionalized primary and secondary windings limits the short circuit current available on the low short circuit capacity busses.

Further objects and advantages of the invention will become apparent as the following description proceeds and features of novelty which characterize the invention will be pointed out in particularity in the claims annexed to and forming a part of this specification.

For a better understanding of the invention, reference may be had to the accompanying drawings, in which:

FIGURE 1 shows a schematic diagram of a power center illustrating an embodiment of the invention;

FIG. 8 shows a schematic diagram of a power center illustrating another embodiment of the invention.

Figure 2:
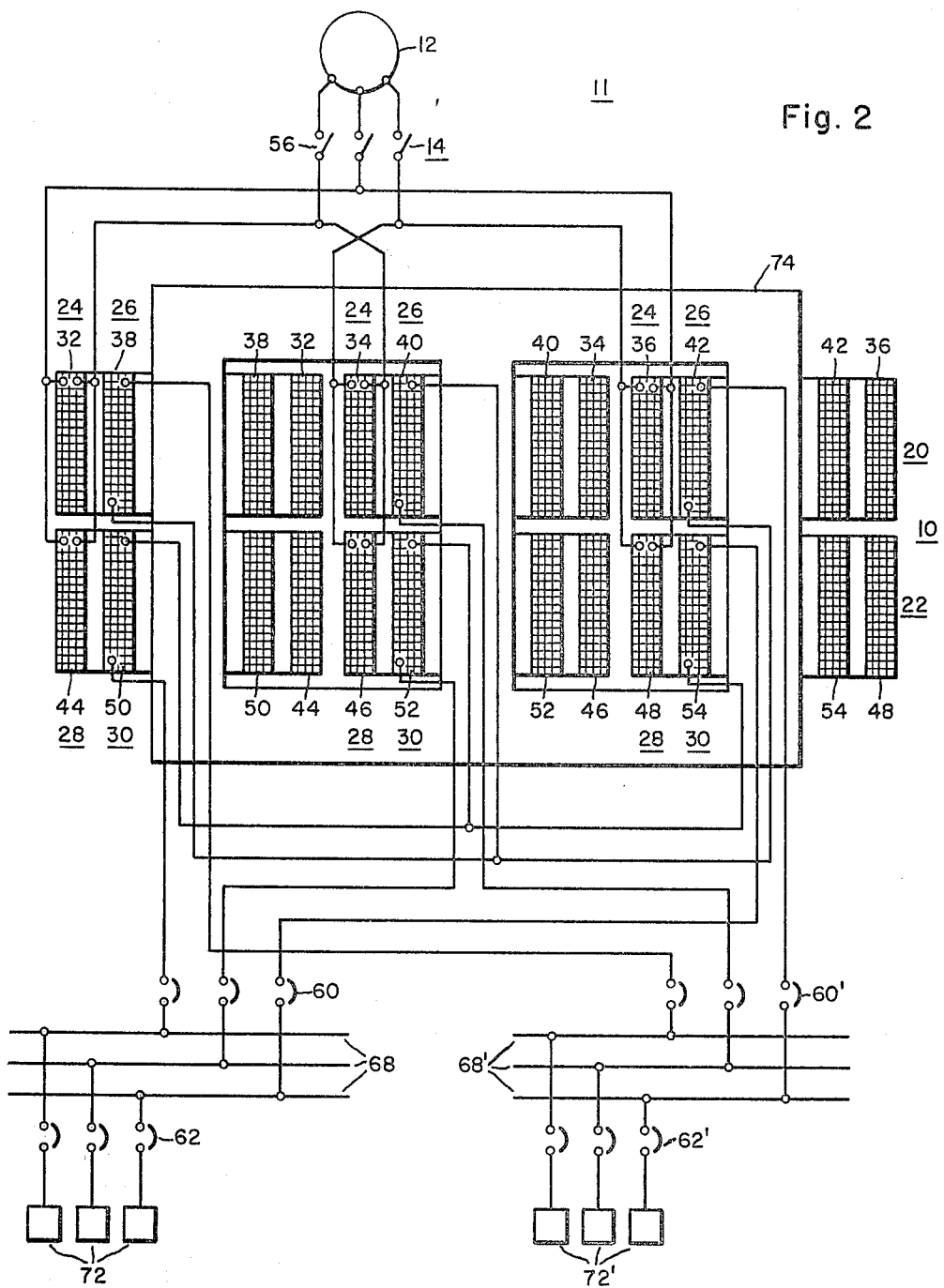
FIG. 2 shows a front elevation of a transformer, in section, constructed in accordance with the teachings of this invention.

Referring now to the drawings, and FIG. 1 in particular, there is shown a schematic diagram of an industrial power center constructed in accordance with the teachings of this invention. Throughout the various drawings, three phase line conductors are indicated with a single line in the secondary switchgear apparatus for purposes of simplicity.

In general, the power center 11 is comprised of polyphase transformer 10 connected to a source of alternating potential 12 through primary disconnecting means or switch 14, and to secondary switchgear apparatus 16 and 18. More specifically, transformer 10, in order to increase its thermal load capability and still obtain an impedance of sufficient magnitude to reduce short circuit currents to magnitudes usually associated with transformers of smaller ratings, is sectionalized to form, in this instance, two essentially independent transformers 20 and 22 inductively disposed on a common magnetic core (not shown) and enclosed in a suitable casing or tank 23. Transformer section 20 includes primary and secondary windings 24 and 26, respectively, and transformer section 22 includes primary and secondary windings 28 and 30, respectively. Primary winding 24 of transformer section 20, comprising primary phase windings 32, 34 and 36, is closely coupled magnetically with secondary winding 26 of transformer 20, comprising secondary phase windings 38, 40 and 42. Primary winding 28 of transformer section 22, comprising primary phase windings 44, 46 and 48 is closely coupled magnetically with secondary winding 30, comprising secondary phase windings 50, 52 and 54. Primary windings 24 and 28 thus serve their corresponding secondary windings 26 and 30, respectively, with good voltage regulation. Primary winding 24 is disposed to be poorly coupled magnetically with secondary winding 30, and primary winding 28 is disposed to be poorly coupled magnetically with secondary winding 26. Thus, primary winding 24 of transformer section 20 serves secondary winding 30 of transformer 22 with poor voltage regulation due to the high flux leakage space between them. In like manner, primary winding 28 of transformer section 22 serves secondary winding 26 of transformer section 20 with poor voltage regulation due to the high flux leakage space between them. This means that any short circuit on secondary winding 26 will be supplied from its closely coupled primary winding 24, and substantially no short circuit current will be supplied from the poorly coupled primary winding 28. Further, any short circuit on secondary winding 30 of transformer section 22 will be supplied from its closely coupled primary winding 28, and substantially no short circuit current will be supplied from the poorly coupled primary winding 24. Therefore, although the rating of the transformer 10 is equal to the sum of the ratings of transformer sections 20 and 22, the short circuit current capability of transformer 10 is the same as if the transformer only comprised transformer section 20, or transformer section 22. Thus it can be seen that if a power center rated 1000 kva. and having a transformer with 7.5% impedance was the maximum rating that could be utilized with conventional low voltage control apparatus having a low short circuit current interrupting capacity, by utilizing the teachings of this invention it would be possible to have a power center rated 2000 kva., or even higher, without producing any greater current upon short circuit than a conventional 1000 kva. transformer.

The primary windings of transformer 10 are connected in parallel circuit relation, thus requiring one disconnect switch 14 between primary windings 24 and 28, and alternating potential source 12. Disconnect switch 14 may comprise contacts 56 enclosed in a suitable housing 58 and connected to transformer casing 23 through a conventional throat section 60. Each secondary winding 26 and 30 is connected to its own switchgear assembly 16 and 18, respectively. Switchgear assemblies 16 and 18 may be of conventional construction, having main circuit breakers 60 and 60' and a plurality of feeder circuit breakers 62 and 62' disposed in compartmentized enclosures 64 and 64', and connected to transformer housing 23 through conventional throat sections 66 and 66'. Feeder circuit breakers 62 and 62' are connected to main busses 68 and 68' from secondary windings 26 and 30, respectively, and to feeder busses 70 and 70'. Feeder busses 70 and 70' are in turn connected to the various industrial plant loads 72 and 72', such as motor control centers.

FIG. 2 shows in detail a transformer constructed according to the teachings of this invention, with like reference numerals in FIGS. 1 and 2 indicating like components.

In general, transformer 10 is comprised of two horizontal layers of primary and secondary phase windings, with one layer being disposed above the other on a common magnetic core 74. The upper layer of phase windings corresponds to transformer section 20, as shown in FIG. 1, and the lower layer of windings corresponds to transformer section 22 as shown in FIG. 1.

Primary winding 24 of transformer section 20 is formed by primary phase windings 32, 34 and 36 being connected, in this instance, in delta arrangement, with the ends of the phase windings being connected to primary disconnecting means 14. The secondary section 26 of transformer section 20 is formed by secondary phase windings 38, 40 and 42 being connected, in this instance, in Y arrangement, with one end of windings 38, 40 and 42 being connected in common, and the remaining ends of the Y arrangement being connected to main circuit breaker 60.

Primary winding 28 of transformer section 22 is formed by primary phase windings 44, 46 and 48 being connected, in this instance, in delta arrangement, with the ends of primary winding 28 being connected to the ends of primary winding 24. Thus the primary windings 24 and 28 are connected in parallel circuit relation with respect to disconnecting means 14 and the source of alternationg potential 12. Secondary winding 30 of transformer section 22 is formed by secondary phase windings 50, 52 and 54 being connected, in this instance, in Y arrangement, with one end of phase windings 50, 52 and 54 being connected in common and the remaining ends being connected to main circuit breaker 60'. Thus, each of the secondary windings 26 and 30 are connected to separate main breakers, 60 and 60', which main breakers are in turn connected through busses 68 and 68' and through feeder breakers 62 and 62' to load circuits 72 and 72', respectively.

Figure 3:
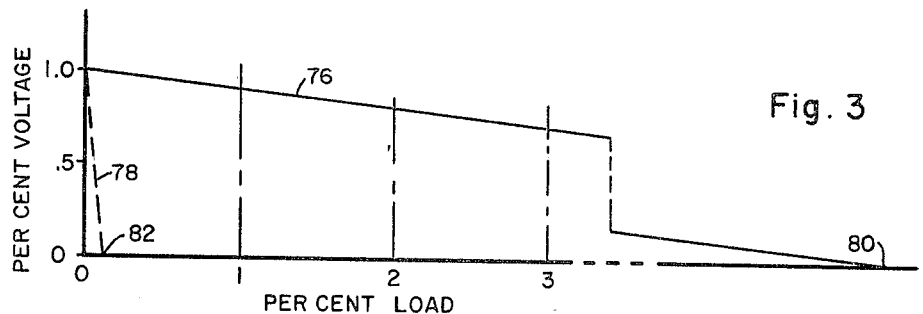
FIG. 3 is a graphic illustration of the voltage regulation of a transformer constructed as shown in FIG. 2.

With the sectionalized winding arrangement shown in FIG. 2, each primary phase winding of primary winding 24 is closely coupled magnetically with its associated secondary phase winding in secondary winding 26. More specifically, primary phase winding 32 is closely coupled with secondary phase winding 38, primary phase winding 34 is closely coupled with secondary phase winding 40, and primary phase winding 36 is closely coupled with secondary phase winding 42. Primary phase windings 32, 34 and 36, thus serve their associated secondary phase windings 38, 40 and 42 with good voltage regulation, as shown by voltage regulation curve 76 in FIG. 3. It can be seen from FIG. 3 that as the per cent load on winding 26 is increased along the abscissa, the percent voltage along the ordinate decreases slowly along curve 76. Curve 76 shows the voltage regulation of transformer section 20, and also of transformer section 22.

Similarly, each primary phase winding of primary winding 28 is closely coupled magnetically with its associated secondary phase winding 30. More specifically, primary phase winding 44 is closely coupled with secondary phase winding 50, primary phase winding 46 is closely coupled with secondary phase winding 52 and primary phase winding 48 is closely coupled with secondary phase winding 54. Primary phase windings 44, 46 and 48 thus serve their associated secondary phase windings 50, 52 and 54 with good voltage regulation, also as shown by voltage regulation curve 76 in FIG. 3.

However, it can be seen by examining FIG. 2, that primary winding 24 of transformer section 20 is loosely coupled with respect to secondary winding 30 of transformer section 22, and primary winding 28 of transformer section 22 is loosely coupled with respect to secondary winding 26 of transformer section 20. The loose coupling between primary and secondary windings 24 and 30 and primary and secondary windings 28 and 26 means that primary phase windings 32, 34 and 36 will serve secondary phase windings 50, 52 and 54 with very poor voltage regulation, due to the high flux leakage space between them, as shown by voltage regulattion curve 78 in FIG. 3. As the load on secondary winding 30 of transformer section 22 is increased, the voltage supplied by primary winding 24 quickly falls to zero. Similarly, primary phase windings 44, 46 and 48 will serve secondary phase windings 38, 40 and 42 with very poor voltage regulation, also as shown by voltage regulation curve 78 in FIG. 3. Therefore, if a short circuit occurs in one of the load circuits 72, the fault contribution by transformer section 22 or the primary and secondary sections 28 and 30, will be as indicated at point 80 of the voltage regulation curves shown in FIG. 3, where voltage regulalation curve 76 reaches zero voltage. The fault contribution by primary section 24 to secondary section 30 is almost negligible in comparison, as shown by point 82 in FIG. 3, where voltage regulation curve 78 reaches zero. Similarly, if a fault occurs in one of the load circuits 72′, the fault contribution by transformer section 20, or the primary and secondary sections 24 and 26, will be as indicated at point 80 in the voltage regulation curve shown in FIG. 3, where voltage regulation curve 76 reaches zero voltage. The fault contribution by primary section 28 to secondary section 26 is almost negligible in comparison, as shown by point 82 in FIG. 3, where voltage regulation curve 78 reaches zero. Assuming for purposes of example that transformer sections 20 and 22 are each rated 1000 kva., it can be seen that the transformer 10 has a total rating of 2000 kva., but that the short circuit current available to a load is substantially the same as if the transformer were rated 1000 kva. The thermal rating of the transformer 10 and power center 20 has thus been doubled, without substantially increasing the short circuit current that would be supplied to a load connected to said power center. It is obvious that by increasing the length of the legs of magnetic core 74, that additional layers of windings or transformer sections may be added, thus further increasing the total thermal rating of transformer 10 without substantially increasing the short circuit current that may be applied by said transformer to any connected load.

The sectionalized winding arrangement of FIG. 2, therefore, allows standard or conventional motor control apparatus, with interrupting capacities in the range of 15,000 to 25,000 amperes, to be applied to the secondary windings 28 and 30 without danger of exceeding their limiting short circuit capacities.

Figure 4:
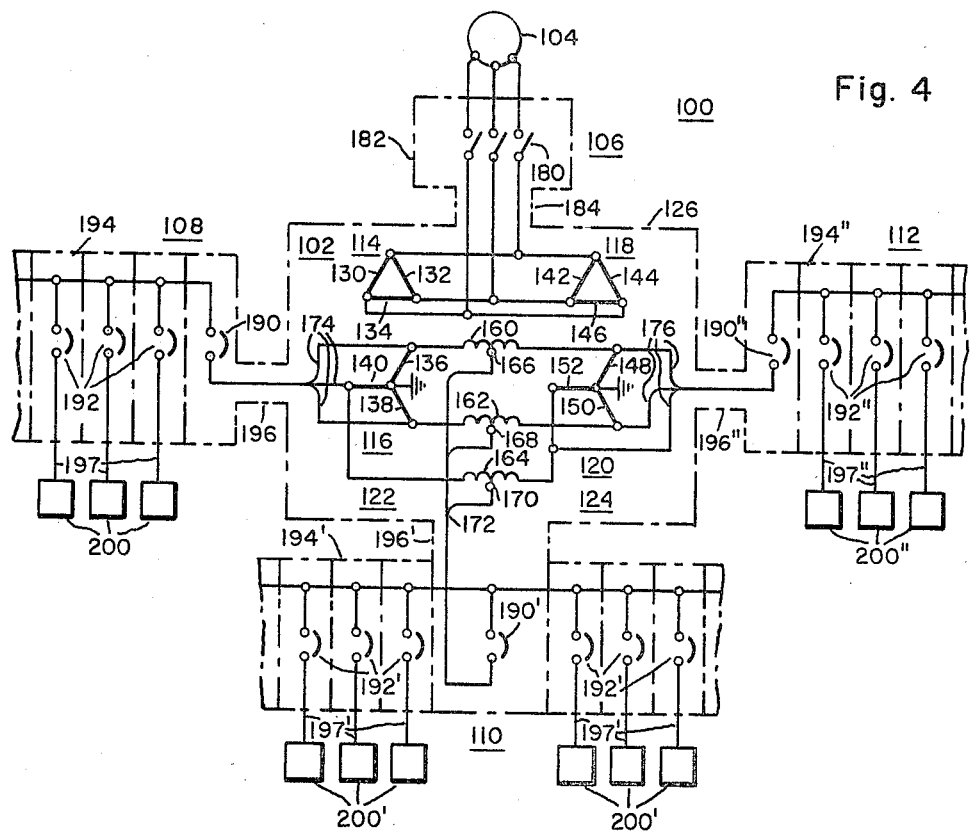
FIG. 4 shows a schematic diagram of a power center illustrating another embodiment of the invention.

FIG. 4 illustrates schematically an embodiment of the invention wherein a single power center 100 provides both low and high impedance busses at the same potention. This arrangement is desirable when large horsepower motors and their associated control are to be served, along with smaller and moderate sized motors and control, with the low impedance or high interrupting capacity busses serving the large motors, and the high impedance or low interrupting capacity busses serving the smaller motors.

In general, power center 100 is comprised of a sectionalized, polyphase transformer 102 connected to a source of alternating potential 104 through primary disconnecting means or switch 106, and to secondary switchgear assemblies 108, 110 and 112. More specifically, sectionalized transformer 102 is constructed to form two virtually independent transformer sections, 122 and 124, with transformer section 122 having primary and secondary windings 114 and 116, respectively, and transformer section 124 having primary and secondary windings 118 and 120, respectively. Transformer sections 122 and 124 are disposed on a common magnetic core (not shown) and enclosed in a suitable tank or casing 126. Primary winding 114 of transformer section 122, comprising primary phase windings 130, 132 and 134, is closely coupled magnetically with secondary winding 116, comprising secondary phase windings 136, 138 and 140. Primary winding 118 of transformer section 124, comprising primary phase windings 142, 144 and 146 is closely coupled magnetically with secondary winding 120, comprising secondary phase windings 148, 150 and 152. Primary windings 114 and 118, thus serve their corresponding secondary windings 116 and 120, respectively, with good voltage regulation. Primary winding 114 is poorly coupled magnetically with secondary winding 120 and primary winding 118 is poorly coupled magnetically with secondary winding 116. Thus, primary winding 114 serves the poorly coupled secondary winding 120 with poor voltage regulation due to the high flux leakage space between them, and primary winding 110 serves the poorly coupled secondary winding 116 with poor voltage regulation for the same reason. This means that any short circuit on secondary winding 116 will be supplied current from its closely coupled primary winding 114, and substantially no short circuit current will be supplied from the poorly coupled primary winding 118; and any short circuit on secondary winding 120 will be supplied current from its closely coupled primary winding 118 and substantially no short circuit current will be supplied from the poorly coupled primary winding 114.

In order to provide a low impedance bus wherein the short circuit current produced by power center 100 will be substantially increased, secondary windings 116 and 120 are connected in parallel circuit relation through load balance coils 160, 162 and 164; taps 166, 168 and 170, which may be at the midpoint of balance coils 160, 162 and 164, respectively, are used to form the high capacity or low impedance bus 172. Therefore, the short circuit capacity of transformer 102 on the low impedance bus 172 is substantially equal to the short circuit capacity of a single transformer having a total kva. rating equal to the sum of the kva. ratings of transformer sections 122 and 124. The sum of the thermal capacities of busses 174, 176 and 172 would be proportioned to be equal in this example to 2000 kva. For example, a practical thermal load division would be 500 kva. thermal on bus 174, 500 kva. thermal on bus 176, and 1000 kva. thermal on bus 172. The short circuit current capacity on bus 174 formed by secondary winding 116 is substantially the same as if the transformer 102 were comprised only of primary and secondary winding 114 and 116, and the short circuit capacity on bus 176 formed by secondary winding 120 is substantially the same as if transformer 102 were comprised only of primary and secondary windings 118 and 120.

As a further example, if a 1000 kva. power center having a transformer with 8.0% impedance was the maximum rating that could be used with low interrupting capacity control apparatus, and other loads were to be served having high interrupting capacities, a transformer constructed as shown in FIG. 4 could be designed to have a thermal rating of 4000 kva., with section impedances of 8% on a 1000 kva. base. In other words, each transformer section 122 and 124 would have 2000 kva. thermal load capability but would have a short circuit capability of a transformer rated 1000 kva. at 8% impedance on its associated bus. Secondary winding 116 would supply 1000 kva. to bus 174 at 8% impedance and 1000 kva. at 8% impedance to balance coils 160, 162 and 164. Secondary winding 120 would supply 1000 kva. at 8% impedance to bus 176 and 1000 kva. at 8% impedance to balance coils 160, 162 and 164. Bus 172, formed by the taps 166, 168 and 170 on balance coils 160, 162 and 164, respectively, would therefore have a load capacity of 2000 kva. at 8% impedance.

Load current balance coils 160, 162 and 164 may be disposed in the same casing or tank 126 as the transformer sections 122 and 124 are disposed, or in a separate enclosure.

The primary sections 114 and 118 are connected in parallel circuit relation with the source of alternating potential 104, thus requiring only one disconnect switch 106. Disconnect switch 106 may comprise contacts 180 enclosed in a suitable housing 182 and connected to transformer casing 126 through a conventional throat section 184. Secondary windings 116 and 120 are connected to switchgear assemblies 108, 110 and 112, with secondary winding 116 being connected directly to switchgear assembly 108, secondary winding 120 being connected directly to switchgear assembly 112, and both secondary windings 116 and 120 being connected to switchgear assembly 110 through balance coils 160, 162 and 164. Switchgear assemblies 108, 110 and 112 may be of conventional construction, each having a main circuit breaker 190, 190' and 190'', respectively, and a plurality of feeder circuit breakers 192, 192' and 192'', respectively, disposed in suitable enclosures 194, 194' and 194'', and connected to transformer housing 126 through throat sections 196, 196' and 196''. Feeder circuit breakers 192, 192' and 192'' are connected to feeder busses 197, 197' and 197'', and to various industrial plant loads 200, 200' and 200'', respectively.

Figure 5:
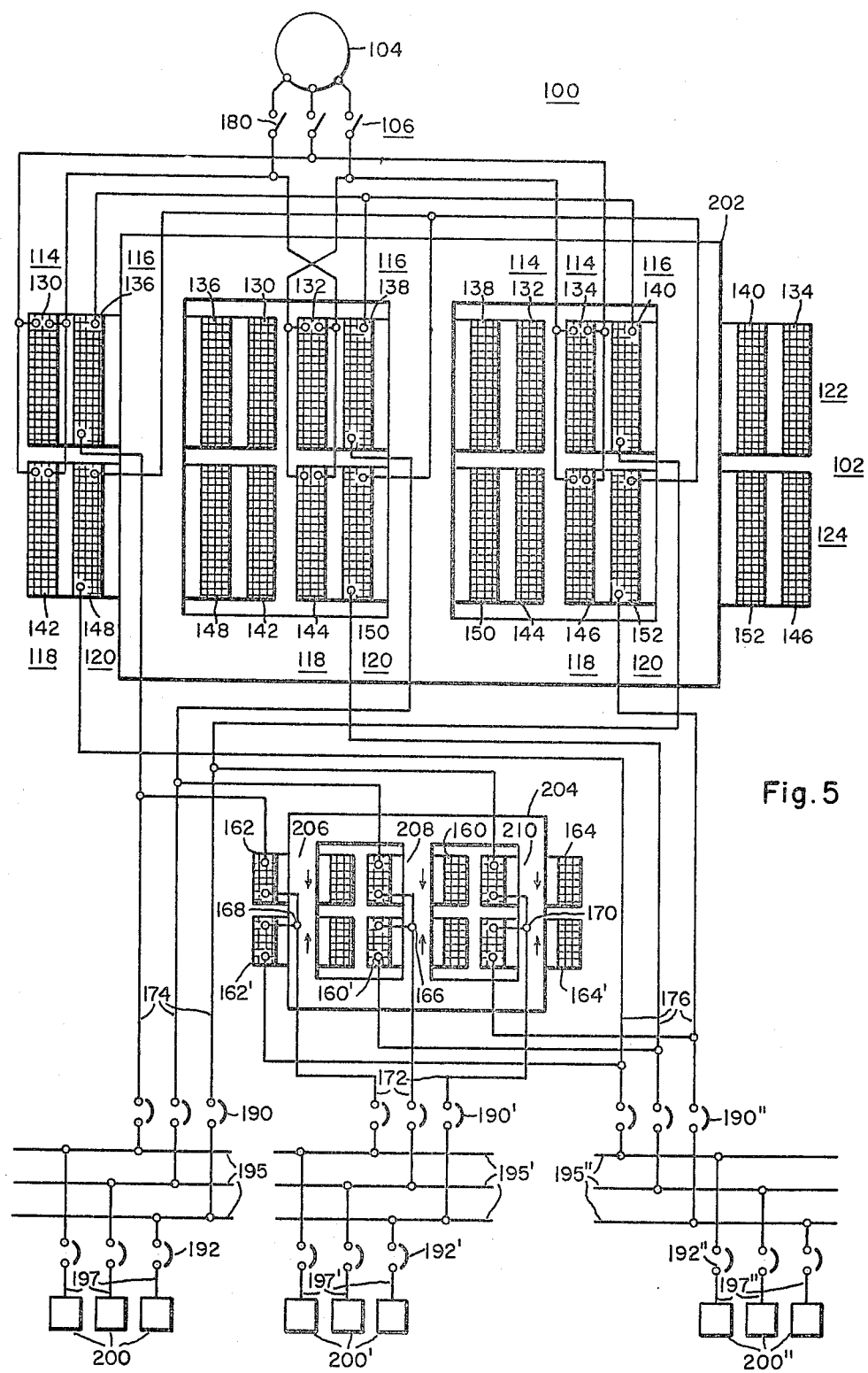
FIG. 5 shows a front elevation of a transformer and load balancing coils, in section, constructed in accordance with the teachings of this invention.

FIG. 5 shows in detail a transformer constructed according to the teachings of this invention, with like reference numerals in FIGS. 4 and 5 indicating like components. In general transformer 102 is comprised of two horizontal layers of phase windings, with one layer being disposed above the other on a common magnetic core 202. The upper layer of phase windings corresponds to transformer section 122, as shown in FIG. 4, and the lower layer of windings corresponds to transformer section 124, as shown in FIG. 4.

Primary winding 114 of transformer section 122 is formed by primary phase windings 130, 132 and 134 being connected, in this instance, in delta arrangement, with the ends of the windings being connected to primary disconnecting means 106. Secondary section 116 is formed by secondary phase windings 136, 138 and 140 being connected in this instance, in Y arrangement, with one end of windings 136, 138 and 140 being connected in common and the remaining ends of the Y arrangement being connected to main circuit breaker 190. Primary winding 118 of transformer section 124 is formed by primary phase windings 142, 144 and 146 being connected, in this instance, in delta arrangement, with the ends of primary winding 118 being connected to the ends of primary winding 114. Thus the primary windings 114 and 118 are connected in parallel circuit relation with respect to disconnecting means 106 and the source of alternating potential 104. Secondary winding 120 of transformer section 124 is formed by secondary phase windings 148, 150 and 152 being connected, in this instance, in Y arrangement, with one end of secondary phase windings 148, 150 and 152 being connected in common and the remaining ends being connected to main circuit breaker 190''.

In order to form the low impedance or high interrupting capacity bus 172, the ends of secondary windings 116 and 120 are also connected to load current balance coils 160, 162 and 164, with taps 166, 168 and 170 forming the low impedance bus 172. The portions of the balance coils 160, 162 and 164 disposed on the side of tap connections 166, 168 and 170 connected to secondary winding 116, are disposed in inductive relation with legs 206, 208 and 210 of magnetic core 204 and form the upper layer of coils shown in FIG. 5. The portions of the balance coils 160, 162 and 164, on the side of tap connections 166, 168 and 170 connected to secondary winding 120, are disposed in inductive relation with the legs 206, 208 and 210, respectively of magnetic core 204, and form the lower layer of coils shown in FIG. 5. For purposes of clarity, the portion of the balance coils disposed in the upper layer will be designated as 160, 162 and 164 and the portion of the balance coils disposed in the lower layer will be designated as 160', 162', and 164'. The coils 160 and 160', disposed on leg 208 of magnetic core 204, are joined at point 166 such that with equal current flowing through coils 160 and 160', the magnetomotive force produced in leg 208 is substantially cancelled. Similarly, coils 162 and 162' are disposed on leg 206 of magnetic core 204 and joined at point 168 such that with equal current flowing through coils 162 and 162', the magnetomotive force produced in leg 206 is substantially cancelled. In like manner, coils 164 and 164' are disposed on leg 210 of magnetic core 204 and joined at point 170 such that with equal current flowing through coils 164 and 164', the magnetomotive force produced in leg 210 is substantially cancelled. When unequal currents are flowing in the coils associated with one of the legs of magnetic core 204, a reactance is produced in that coil having the higher current, thus equalizing the currents in the two coils.

Figure 6:
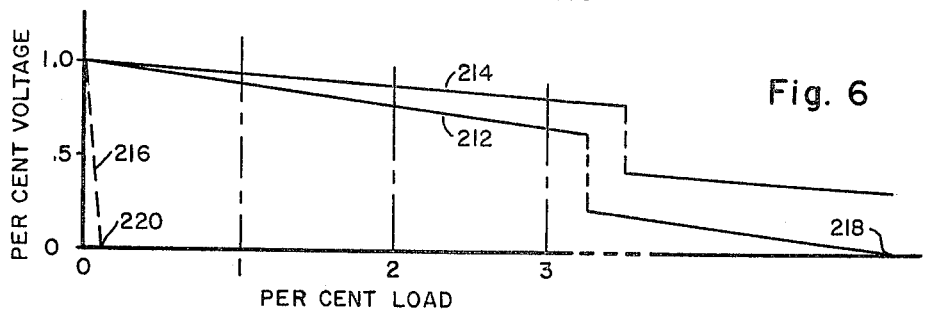
FIG. 6 is a graphic illustration of the voltage regulation of a transformer constructed as shown in FIG. 5.

With the sectionalized winding arrangement shown in FIG. 5, each primary phase winding of primary winding 114 is closely coupled magnetically with its associated secondary phase winding 116. More specifically, primary phase winding 130 is closely coupled with secondary phase winding 136, primary phase winding 132 is closely coupled with secondary phase winding 138, and primary phase winding 134 is closely coupled with secondary phase winding 140. Primary phase windings 130, 132 and 134 thus serve their associated secondary phase windings 136, 138 and 140 with good voltage regulation as shown by voltage regulation curve 212 in FIG. 6. It can be seen in FIG. 6 that as the per cent load on secondary winding 160 is increased along the abscissa, the per cent voltage along the ordinate decreases slowly along curve 212. Curve 212 shows the voltage regulation of transformer section 122 on bus 174, and also of transformer section 124 on bus 176. Similarly, each primary phase winding of primary winding 118 is closely coupled magnetically with its associated secondary phase winding of secondary winding 120. More specifically, primary phase winding 142 is closely coupled with secondary phase winding 148, primary phase winding 144 is closely coupled to secondary phase winding 150 and primary phase winding 146 is closely coupled with secondary phase winding 152. Primary phase windings 142, 144 and 146 thus serve their associated secondary phase windings 148, 150 and 152 with good voltage regulation, also as shown by voltage regulation curve 212 in FIG. 6. The voltage regulation on the low impedance bus 172 served by both secondary sections 116 and 120 through load balance coils 160, 162 and 164 is shown by curve 214 of FIG. 6. It will be noted that the voltage regulation on bus 172 is substantially twice as good as the voltage regulation on the feeder busses 174 and 176.

However, it can be seen by examining FIG. 5, that primary winding 114 of transformer section 122 is loosely coupled with respect to secondary winding 120 of transformer section 124, and primary winding 118 of transformer section 124 is loosely coupled with respect to secondary winding 116 of transformer section 122. The loose coupling between primary and secondary windings 114 and 116 and primary and secondary windings 118 and 120, means that primary phase windings 130, 132 and 134 will serve secondary phase windings 148, 150 and 152 with very poor voltage regulation, due to the high flux leakage space between them, as shown by voltage regulation curve 216 in FIG. 6. As the load on secondary winding 120 of transformer section 124 is increased, the voltage supplied by primary winding 114 quickly falls to zero. Similarly, primary phase windings 142, 144, and 146 will serve secondary phase windings 136, 138 and 140 with very poor voltage regulation, also as shown by voltage regulation curve 216 in FIG. 6. Therefore, if a short circuit occurs in one of the load circuits 200, the fault contribution by transformer section 122, will be as indicated at point 218 of the voltage regulation curves shown in FIG. 6, where the voltage regulation curves 212 reaches zero voltage. The fault contribution by primary winding 118 to secondary winding 116 is almost negligible in comparison, as shown by point 220 in FIG. 6, where voltage regulation curve 216 reaches zero. Similarly, if the fault occurred in one of the load circuits 200″, the fault contribution by transformer section 124 will be as indicated at point 218 of the voltage regulation curve shown in FIG. 6. The fault contribution by primary winding 114 to secondary winding 120 is almost negligible in comparison, as shown by point 220 in FIG. 6. Assuming, for purposes of example, that transformer sections 122 and 124 are each rated 2000 kva., it can be seen that the transformer 102 has a total rating of 4000 kva., but that the short circuit current available to load circuits 200 or 200″ is substantially the same as if the transformer were rated 1000 kva. The thermal rating of the transformer 102 and power center 100 has thus been substantially increased without increasing the short circuit current that would be applied to a load connected to certain of the feeder busses of the power center. On the other hand, certain of the other busses of the power center have a substantially increased short circuit capacity for feeding larger industrial loads.

It will be obvious that by increasing the length of the legs of the magnetic core 202, additional layers of windings of transformer sections may be added, thus further increasing the total thermal rating of the transformer 110 without substantially increasing the short circuit current that may be applied by said transformer to certain of the feeder busses. The winding arrangement of FIG. 5, therefore, allows standard or conventional motor control apparatus with low interrupting capacities and large motors with control having high interrupting capacities to be connected to the same power center without danger of exceeding the limiting interrupting capacities of the control associated with the smaller motor horsepower ratings. Further, the arrangement of FIG. 5 allows a greatly increased thermal load to be designed into one power center without increasing the interrupting capacity on the high impedance or low interrupting capacity busses.

Figure 7:
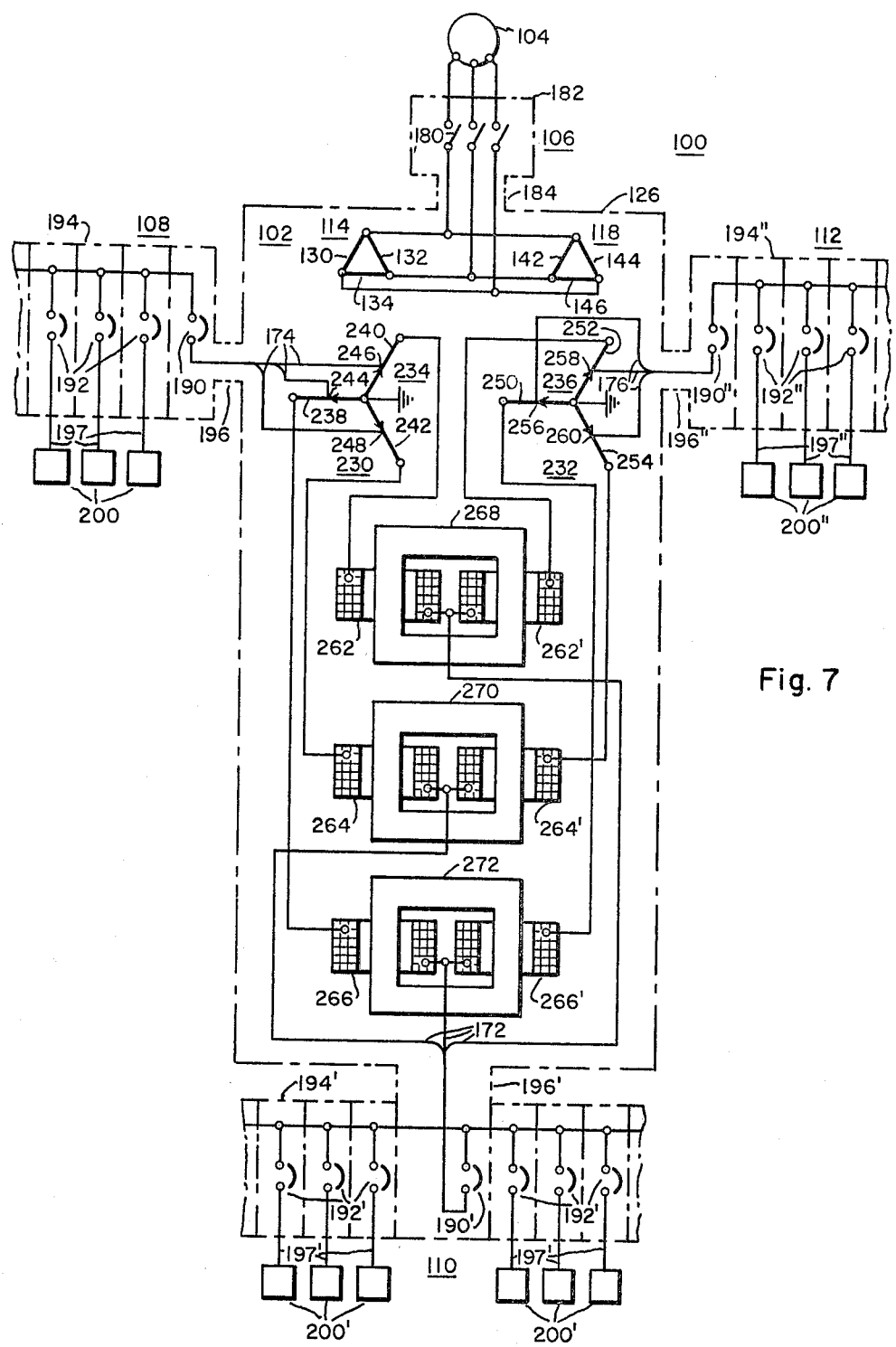
FIG. 7 shows a schematic diagram of a power center illustrating another embodiment of the invention.

FIG. 5 illustrates an embodiment of the invention whereby low and high impedance busses of the same potential were developed in a single transformer equipment of an industrial power center. FIG. 7 illustrates an embodiment of the invention whereby low and high impedance busses of different potentials are developed in a single transformer equipment of an industrial power center. Like reference numerals in FIGS. 4 and 7 indicate like components, with the essential differences in the two figures being in the secondary windings of the transformer sections and in the type of balance coils uitlized. More specifically, transformer 102 is comprised of two virtually independent transformer sections 230 and 232, with transformer section 230 having a primary winding 114 and a secondary winding 234, and transformer section 232 having a primary winding 118 and a secondary winding 236. Secondary winding 234 of transformer section 230 is comprised of secondary phase windings 238, 240 and 242, with said windings each having a tap connection 244, 246 and 248, respectively. The tap connections 244, 246 and 248 on said secondary phase windings are disposed to provide the proper potential for the high impedance feeder busses 174. The ends of phase windings 238, 240 and 242 provide the higher potental required by the low impedance feeder busses 172.

In like manner, transformer section 232 is comprised of primary winding 118 and secondary winding 236, with secondary winding 236 being formed of secondary phase windings 250, 252 and 254. Secondary phase windings 250, 252 and 254 have taps 256, 258 and 260 suitably disposed thereon to provide the proper potential for high impedance feeder busses 176. The ends of phase windings 250, 252 and 254 provide the potential required for low impedance feeder busses 172.

The various primary and secondary phase windings of transformer 102 are disposed on a common magnetic core (not shown) such that the primary phase windings 130, 132 and 134 of primary section 114 are closely coupled magnetically with their associated secondary phase windings 238, 240 and 242 of secondary section 234. In like manner, the primary phase windings 142, 144 and 146 of primary section 118 are disposed to be closely coupled magnetically with their associated secondary phase windings 250, 252 and 254 of secondary winding 236. The various primary and secondary phase windings are disposed similar to those shown in FIGS. 2 and 5, such that the primary winding 114 is poorly coupled magnetically with secondary winding 236 and primary winding 118 is poorly coupled magnetically with secondary winding 234. Thus, any short circuit on feeder bus 174 will have substantially all of its current supplied by closely coupled primary winding 114 and substantially no current will be supplied by the poorly coupled primary winding 118. Also, a short circuit on bus 176 will have its current substantially all supplied by closely coupled primary winding 118, and substantially no current will be supplied by poorly coupled primary winding 114. In order to provide a low impedance bus 172 at a different potential than the high impedance bus 174 and 176, the ends of the various secondary phase windings are connected together through load balance coils 262 and 262′, 264 and 264′ and 266 and 266′. The ends of secondary phase windings 240 and 252 are connected together through balance coils 262 and 262′, which are inductively disposed on magnetic core 268. Load balance coils 262 and 262′ are joined together, with the junction forming one of the high potential load means busses 172. In like manner, the ends of secondary phase windings 242 and 250 are connected together through load balance coils 264 and 264′, which are inductively disposed on magnetic core 270. Load balance coils 264 and 264′ are joined together, and the junction of said coils forms another of the high potential, low impedance busses 172. Secondary phase windings 238 and 250 are connected together through load balance coils 266 and 266′, which are inductively disposed on magnetic core 272. Load balance coils 266 and 266' are joined together, and the junction forms another of the high potential low impedance feeder busses 172.

Thus, one power center has been provided which provides low potential busses having high impedance which allows the use of conventional motor control associated with low or moderately sized horsepower motors. Also, the same power center provides high potential, low impedance busses for supplying larger industrial loads, such as large horsepower motors. For example, the power center in FIG. 7 may be rated 4000 kva., with each transformer section 230 and 232 being rated 2000 kva. each. The feeder bus 174 would provide load circuits 200 with a total thermal load capability of 1000 kva. with the short circuit capacity of a conventional transformer rated 1000 kva. with an impedance of approximately 7.5%. The secondary section 234 would also provide 1000 kva. to the various load balance coil assemblies. In like manner, secondary winding 236 would provide a total thermal load capabity of 1000 kva. to feeder busses 176 with a short circuit current capability of a conventional transformer rated 1000 kva. having an impedance of approximately 7.5%. Secondary winding 236 would also provide 1000 kva. to the load current balance coil assemblies. The various balance coils 262 and 262', 264 and 264' and 266 and 266' form a high potential low impedance bus 172 which has a thermal load capability of 2000 kva. and an impedance of approximately 7.5%.

FIG. 8 illustrates another embodiment of the invention wherein an industrial power center is formed having three sections with three low interrupting capacity and one high interrupting capacity busses. More specifically, a transformer 300, which is connected to an alternating potential source 307 through disconnect means 309, has three, virtually independent, transformer sections 302, 304 and 306 inductively disposed on a common magnetic core (not shown). Transformer section 302 comprises primary winding 308 and secondary winding 310, transformer section 304 comprises primary winding 312 and secondary winding 314, and transformer section 306 comprises primary winding 316 and secondary winding 318. Primary winding 308 of transformer section 302 is closely coupled magnetically with secondary winding 310 but, as hereinbefore shown in FIGS. 2 and 5, primary windings 312 and 316 are poorly coupled with respect to secondary winding 310. Similarly, primary winding 312 and secondary winding 314 of transformer section 304 are closely couple magnetically, but primary windings 308 and 316 are poorly coupled magnetically with respect to secondary winding 314. In like manner, primary winding 316 and secondary winding 318 of transformer section 306 are closely coupled magnetically, but primary windings 308 and 312 are poorly coupled magnetically with respect to secondary winding 318.

Secondary winding 310 of transformer section 302 is connected through main circuit breaker 320, through feeder breakers 322 to various industrial loads 324. In like manner, secondary windings 314 and 318 are connected through main circuit breakers 320' and 320", through feeder circuit breakers 322' and 322" to various industrial load circuits 324' and 324", respectively. Therefore, any short circuit condition occurring in industrial loads 324, 324' or 324" is supplied current by a closely coupled primary winding, with very little short circuit current being supplied from the poorly coupled primary windings. For example, if a short circuit condition occurred in one of the load circuits 324, the short circuit current would be almost completely supplied by the closely coupled primary winding 308 of secondary winding 310, with substantially no short circuit current being supplied by the loosely coupled primary windings 312 and 316.

In order to form a low impedance bus, the ends of the various secondary phase windings are connected through load balance coils to a common point which is used to form the low impedance bus. As shown in FIG. 8, a magnetic core 330 having three legs, 332, 334 and 336, may be used to supply one phase of the low impedance bus. Conductor 338, from secondary winding 310, may be inductively disposed with legs 332 and 334 of magnetic core 330. In like manner, conductor 340, from secondary winding 314, may be inductively disposed with legs 334 and 336 of magnetic core 330. Similarly, conductor 342, from secondary winding 318, may be inductively disposed with legs 336 and 332 of magnetic core 330. The various coils formed by conductors 338, 340 and 342 are disposed such that the magnetomotive force developed or produced in legs 332, 334 and 336 opposes the magnetomotive force produced by the associated winding on the same leg. Therefore, when the currents in the various conductors 338, 340 and 342 are equal, the magnetomotive force produced in the various legs 332, 334 and 336 of magnetic core 330 is cancelled. When the current in one of the lines exceeds the current in the coil on the same leg, a reactance is developed in the coil containing the higher current, causing the current to be reduced so that the current flowing through the coils on the same legs is substantially equal. After forming two coils on two of the legs of magnetic core 330, the conductors 338, 340 and 342 are connected in common to form bus 350 which is one of the phases of the low impedance bus. In like manner, conductors from secondary windings 310, 314 and 318 are connected to two similar balance coil arrangements to provide the other two phases of the low impedance bus. The low impedance bus 350 is connected through main circuit breaker 352 through feeder circuit breaker 354 to the various load circuits 356 which require a low impedance or high capacity bus.

Therefore, the power center shown in FIG. 8 may have a total rating of 6000 kva., with load circuit 324 being supplied 1000 kva. at approximately 7% impedance, load circuit 324' being supplied 1000 kva. at substantially 7% impedance, load circuits 324" being supplied 1000 kva. at substantially 7% impedance, and load circuit 356 being supplied with 3000 kva. at substantially 7% impedance. Thus, a power center with a rating of 6000 kva. is designed using the principles taught by this invention, which still allows small industrial loads with their low limiting interrupting capacities to be connected to said power center. At the same time, the same power center provides busses having a low impedance and therefore capable of supplying high interrupting capacity to the larger industrial plant loads.

It will, therefore, be apparent that there has been disclosed an industrial power center which provides in one package a high thermal rating but a short circuit current of magnitudes usually associated with power centers having a much smaller thermal rating. In other words, conventional low voltage motor control apparatus no longer limits the maximum rating of the power center that they can be connected to. Further, where it is desirable to have both low and high impedance feeder busses, the teachings of this invention disclose how they may be combined into one integral power center.

Since numerous changes may be made in the above-described apparatus and different embodiments of the invention may be made without departing from the spirit thereof, it is intended that all matter contained in the foregoing description or shown in the accompanying drawings shall be interpreted as illustrative, and not in a limiting sense.

I claim as my invention:

1. A power center connected to a source of alternating potential and a plurality of load circuits, comprising a transformer, said transformer having at least two high voltage windings and associated low voltage windings of like phase inductively disposed on a common winding leg of a magnetic core, the high voltage windings of said transformer being connected in parallel circuit relation with said alternating potential source, the low voltage windings each being connected in circuit relation with one of said load circuits, each of the high voltage windings of said transformer being radially and concentrically coupled on said magnetic core with its associated low voltage winding and axially spaced with respect to the remaining high and low voltage windings.

2. A power center connected to a source of alternating potential and a plurality of load circuits, comprising disconnecting means, said disconnecting means being connected in circuit relation with said source of alternating potential, transformer means, said transformer means having at least two primary windings and associated secondary windings of like phase inductively disposed on a common winding leg of a magnetic core, the primary windings of said transformer means being connected in parallel circuit relation with said disconnecting means, each of the secondary windings of said transformer means being connected in circuit relation with a different load circuit, each of said primary windings being coupled radially and concentrically with its associated secondary winding, providing a low leakage impedance, said primary windings being axially spaced from all other primary and secondary windings, providing a high leakage impedance.

3. A power center having primary disconnecting means connected in circuit relation with a source of polyphase alternating potential and switchgear means connected in circuit relattion with a plurality of load circuits, comprising a sectionalized transformer, said sectionalized transformer having a magnetic core and at least two primary windings and associated secondary windings, each of said primary and secondary windings having a plurality of phase windings, with like phases being disposed on common portions of said magnetic core, said primary windings being connected in parallel circuit relation with said primary disconnecting means, said secondary windings being connected in circuit relation with said switchgear means, each phase winding of each of said primary sections being radially and concentrically coupled with its associated secondary phase winding, providing low leakage impedance between each primary winding and its associated secondary winding, the phase windings of each of said primary sections being axially spaced from the remaining primary and secondary phase windings of like phase, providing a high leakage impedance between these windings.

4. A power center connected to a source of alternating potential and a plurality of load circuits, comprising a transformer, said transformer having at least two high voltage windings and associated low voltage windings of like phase inductively disposed on a common portion of a magnetic core, the high voltage windings of said transformer being connected in parallel circuit relation with said alternating potential source, each of the low voltage windings being connected in circuit relation with a different load circuit, each of the high voltage windings of said transformer being radially and concentrically coupled on said magnetic core with its associated low voltage winding and axially spaced from the remaining high and low voltage windings, current balance means, each of said low voltage windings being connected to said current balance means, said current balance means being connected in circuit relation with another of said load circuits.

5. A power center connected to a source of alternating potential and a plurality of load circuits, comprising disconnecting means, said disconnecting means being connected in circuit relation with said source of alternating potential, transformer means, said transformer means having at least two primary windings and associated secondary windings of like phase inductively disposed on a winding leg of a magnetic core, the primary windings of said transformer means being connected in parallel circuit relation with said disconnecting means, each of the secondary windings of said transformer means being connected in circuit relation with a different load circuit, each of said primary windings being radially and concentrically coupled with its associated secondary winding, providing a low leakage impedance, said primary windings being axially spaced from all other primary and secondary windings, providing a high leakage impedance, balance coil means, each of said secondary windings of said transformer means being connected in circuit relation with said balance coil means, said balance coil means being connected in circuit relation with still another load circuit.

6. A power center having primary disconnecting means connected in circuit relation with a source of polyphase alternating potential and switchgear means connected in circuit relation with a plurality of load circuits, comprisings a sectionalized transformer, said sectionalized transformer having a magnetic core and at least two primary sections and associated secondary sections, each of said primary and secondary sections having a plurality of phase windings, with like phases being disposed on common portions of said magnetic core, said primary sections being connected in parallel circuit relation with said primary disconnecting means, said secondary sections being connected in circuit relation with said switchgear means, each of the phase windings of said primary sections being radially and concentrically coupled with the phase winding of its associated secondary section, providing low leakage impedance between each primary section and its associated secondary section, the phase windings of each of said primary sections being axially spaced from the remaining primary and secondary windings of similar phase, providing a high leakage impedance between these windings, balance coil means each having first and second ends and a mid-tap, the ends of the phase windings of each of said secondary sections of similar phase being connected to the first and second ends of said balance coil means, the mid-taps of said balance coil means being connected in circuit relation with said switchgear means, the switchgear means connected to said balance coil means being connected in circuit relation with load circuits requiring a low impedance bus and the switchgear means connected directly to said secondary sections being connected in circuit relation with load circuits requiring a high impedance bus.

7. A power center comprising disconnecting means adapted for connection to a source of polyphase alternating potential, switchgear means adapted for connection to a plurality of independent load circuits, a sectionalized transformer, said sectionalized transformer having a magnetic core and at least two primary sections and associated secondary sections, each of said primary and secondary sections having a plurality of phase windings, with like phases being disposed on common portions of said magnetic core, each of said secondary phase windings having a voltage tap between the ends of said winding, said primary sections being connected in parallel circuit relation with said disconnecting means, the voltage taps on said secondary phase windings being connected in circuit relation with said switchgear means, each phase winding of said primary windings being radially and concentrically coupled with the phase winding of its associated secondary section, providing low leakage impedance between each primary section and its associated secondary section, the phase windings of each of said primary sections being axially spaced from the remaining primary and secondary phase windings of similar phase, providing a high leakage impedance between these windings, balance coil means, the ends of similar secondary phase windings being connected together through said balance coil means, said balance coil means being connected in circuit relation with said switchgear means, the switchgear means connected in circuit relation with said secondary sections being connected to load circuits requiring high impedance busses and the switchgear means connected in circuit relation with said balance coil means being connected to load circuits requiring low impedance busses.

References Cited by the Examiner

UNITED STATES PATENTS

| | | | |
|---|---|---|---|
| 963,132 | 7/1910 | Frank | 336—12 |
| 1,815,542 | 9/1931 | Gay | 307—147 |
| 2,264,836 | 12/1941 | Garin | 307—19 |
| 2,357,098 | 9/1944 | Garin | 307—147 |
| 2,418,643 | 4/1947 | Huge | 336—5 XR |
| 2,591,582 | 4/1952 | Monette | 323—48 XR |

FOREIGN PATENTS 655,310  9/1959  Canada.

ORIS L. RADER, *Primary Examiner.*

T. J. MADDEN, *Assistant Examiner.*